United States Patent
Bourdelais et al.

(10) Patent No.: US 6,867,927 B2
(45) Date of Patent: Mar. 15, 2005

(54) TRANSPARENT SURFACE FORMED COMPLEX POLYMER LENSES

(75) Inventors: Robert P. Bourdelais, Pittsford, NY (US); Cheryl J. Kaminsky, Rochester, NY (US); Jehuda Greener, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 322 days.

(21) Appl. No.: 10/094,977

(22) Filed: Mar. 11, 2002

(65) Prior Publication Data

US 2003/0169512 A1 Sep. 11, 2003

(51) Int. Cl.[7] ............... G02B 5/02; G02B 27/12; G03B 21/62
(52) U.S. Cl. ............... 359/707; 359/455; 359/599; 359/620
(58) Field of Search ............... 359/619–624, 359/626, 628, 599, 707, 454–456

(56) References Cited

U.S. PATENT DOCUMENTS

| | | | | |
|---|---|---|---|---|
| 4,427,265 A | * | 1/1984 | Suzuki et al. | 359/599 |
| 6,130,777 A | * | 10/2000 | Yamashita et al. | 359/456 |
| 6,661,552 B2 | * | 12/2003 | Hira | 359/237 |
| 6,721,102 B2 | * | 4/2004 | Bourdelais et al. | 359/628 |
| 6,798,574 B2 | * | 9/2004 | Kim | 359/566 |

* cited by examiner

Primary Examiner—Georgia Epps
Assistant Examiner—Deborah Raizen
(74) Attorney, Agent, or Firm—Arthur W. Kluegel

(57) ABSTRACT

Disclosed is a transparent polymeric film having a top and bottom surface comprising a plurality of complex lenses on at least one surface thereof and containing as its primary ingredient a polymer sufficient to impart to the film a light transmission of at least 92% based on a film thickness of 125 micrometers.

37 Claims, 2 Drawing Sheets

TRANSPARENT SURFACE FORMED COMPLEX POLYMER LENSES

CROSS REFERENCE TO RELATED APPLICATIONS

This application is one of a group of seven applications co-filed under Ser. Nos. 10/095,204, 10/095,601, 10/095,145, 10/095,172, 10/095,319, 10/094,977, 10/094,979.

FIELD OF THE INVENTION

The invention relates to a diffuser for specular light. In a preferred form, the invention relates to a back light diffuser for rear projection liquid crystal display devices.

BACKGROUND OF THE INVENTION

Optical structures that scatter or diffuse light generally function in one of two ways: (a) as a surface diffuser utilizing surface roughness to refract or scatter light in a number of directions; or (b) as a bulk diffuser having flat surfaces and embedded light-scattering elements.

A diffuser of the former kind is normally utilized with its rough surface exposed to air, affording the largest possible difference in index of refraction between the material of the diffuser and the surrounding medium and, consequently, the largest angular spread for incident light. However, some prior art light diffusers of this type suffer from a major drawback: the need for air contact. The requirement that the rough surface must be in contact with air to operate properly may result in lower efficiency. If the input and output surfaces of the diffuser are both embedded inside another material, such as an adhesive for example, the light-dispersing ability of the diffuser may be reduced to an undesirable level.

In one version of the second type of diffuser, the bulk diffuser, small particles or spheres of a second refractive index are embedded within the primary material of the diffuser. In another version of the bulk diffuser, the refractive index of the material of the diffuser varies across the diffuser body, thus causing light passing through the material to be refracted or scattered at different points. Bulk diffusers also present some practical problems. If a high angular output distribution is sought, the diffuser will be generally thicker than a surface diffuser having the same optical scattering power. If however the bulk diffuser is made thin, a desirable property for most applications, the scattering ability of the diffuser may be too low.

Despite the foregoing difficulties, there are applications where a surface diffuser may be desirable, where the bulk type of diffuser would not be appropriate. For example, the surface diffuser can be applied to an existing film or substrate thus eliminating the need to for a separate film. In the case of light management in a LCD, this increases efficiency by removing an interface (which causes reflection and lost light).

Light transmission through a light diffuser is a critical parameter as high light transmission allows display screens that use light diffusers to be bright as source light energy is transmitted to the observers eye. There is a continuing need to provide light diffusers that have a high degree of light transmission and high haze. Prior art light diffusers for liquid crystal devices typically comprise coated polymer beads in a polymer matrix applied to a polymer base. Polymer selection is a critical parameter in the function of the light diffuser. Polymers that exhibit a high degree of crystallinity generally have lower light transmission than polymers that are less crystalline. Crystallinity in a polymer creates small index of refraction differences in the polymer, allowing for inefficient refraction between the index of refraction changes to occur resulting in a loss in light transmission. Polymers that are amorphous or those polymers that have crystallinity less than 10% are optically clear and therefore have significant commercial value as diffusion film materials.

U.S. Pat. No. 6,270697 (Meyers et al.), blur films are used to transmitted infrared energy of a specific waveband using a repeating pattern of peak-and-valley features. While this does diffuse visible light, the periodic nature of the features is unacceptable for a backlight LC device because the pattern can be seen through the display device.

U.S. Pat. No. 6,266,476 (Shie et al.) discloses a microstructure on the surface of a polymer sheet for the diffusion of light. The microstructures are created by molding Fresnel lenses on the surface of a substrate to control the direction of light output from a light source so as to shape the light output into a desired distribution, pattern or envelope. While the materials disclosed in U.S. Pat. No. 6,266,476 shape and collimate light and therefore are not efficient diffusers of light particularly for liquid crystal display devices.

It is known to produce transparent polymeric film having a resin coated on one surface thereof with the resin having a surface texture. This kind of transparent polymeric film is made by a thermoplastic embossing process in which raw (uncoated) transparent polymeric film is coated with a molten resin, such as polyethylene. The transparent polymeric film with the molten resin thereon is brought into contact with a chill roller having a surface pattern. Chilled water is pumped through the roller to extract heat from the resin, causing it to solidify and adhere to the transparent polymeric film. During this process the surface texture on the chill roller's surface is embossed into the resin coated transparent polymeric film. Thus, the surface pattern on the chill roller is critical to the surface produced in the resin on the coated transparent polymeric film.

One known prior process for preparing chill rollers involves creating a main surface pattern using a mechanical engraving process. The engraving process has many limitations including misalignment causing tool lines in the surface, high price, and lengthy processing. Accordingly, it is desirable to not use mechanical engraving to manufacture chill rollers.

The U.S. Pat. No. 6,285,001 (Fleming et al) relates to an exposure process using excimer laser ablation of substrates to improve the uniformity of repeating microstructures on an ablated substrate or to create three-dimensional microstructures on an ablated substrate. This method is difficult to apply to create a master chill roll to manufacture complex random three-dimensional structures and is also cost prohibitive.

In U.S. Pat. No. 6,124,974 (Burger) the substrates are made with lithographic processes. This lithography process is repeated for successive photomasks to generate a three-dimensional relief structure corresponding to the desired lenslet. This procedure to form a master to create three-dimensional features into a plastic film is time consuming and cost prohibitive.

PROBLEM TO BE SOLVED BY THE INVENTION

There remains a need for an improved light diffusion of image illumination light sources to provide improved diffuse light transmission while simultaneously diffusing specular light sources.

SUMMARY OF THE INVENTION

The invention provides a transparent polymeric film having a top and bottom surface comprising a plurality of complex lenses on at least one surface thereof and containing as its primary ingredient a polymer sufficient to impart to the film a light transmission of at least 92% based on a film thickness of 125 micrometers.

ADVANTAGEOUS EFFECT OF THE INVENTION

The invention provides improved light transmission while simultaneously diffusing specular light sources.

DETAILED DESCRIPTION OF THE INVENTION

Figure 1:
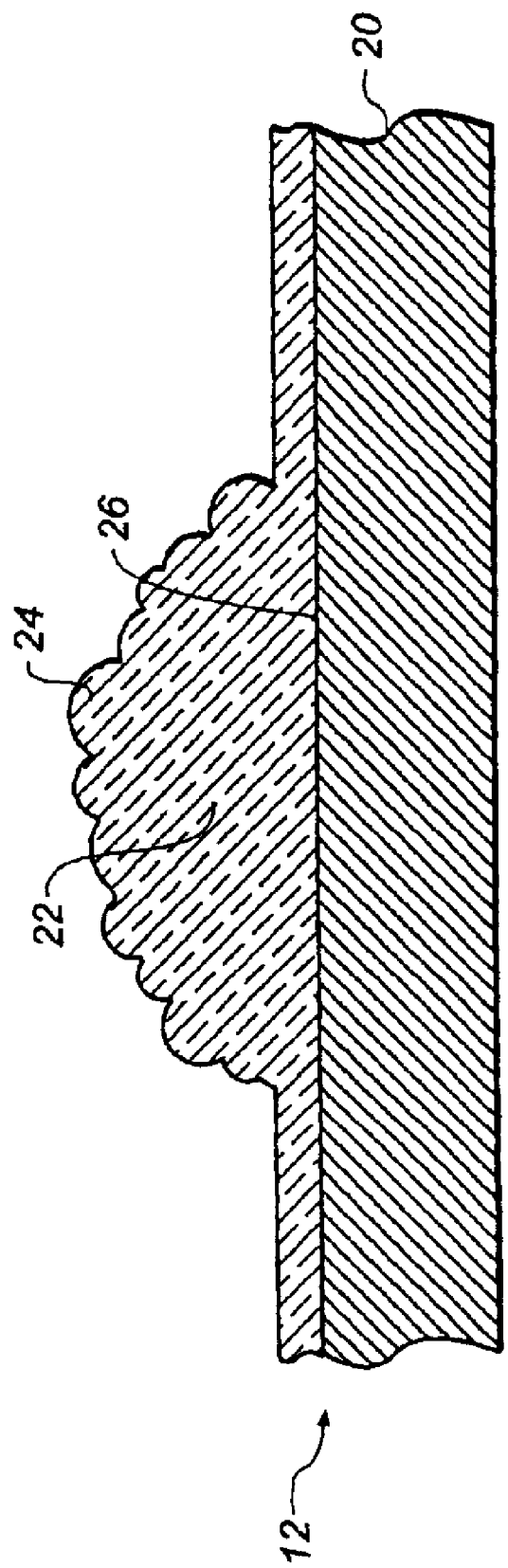
FIG. 1 illustrates a cross section of an amorphous polymer complex lens formed on a transparent base material suitable for use in a liquid crystal display device.

The invention has numerous advantages over prior practices in the art. The invention provides diffusion of specular light sources that are commonly used in rear projection display devices such as liquid crystal display devices. Further, the invention, while providing diffusion to the light sources, has a high light transmission rate. A high transmission rate for light diffusers is particularly important for liquid crystal display devices as a high transmission value allows the liquid crystal display to be brighter or holding the level of brightness the same, allows for the power consumption for the back light to be reduces therefore extending the lifetime of battery powered liquid crystal devices that are common for note book computers. The polymer materials used for the transparent base a and lenses are amorphous and therefore are optically clearer that polymer materials that are predominately crystalline in nature. The surface lens structure polymer layer of the invention can be easily changed to achieve the desired diffusion and light transmission requirements for many liquid crystal devices thus allowing the invention materials to be responsive to the rapidly changing product requirements in the liquid crystal display market.

The elastic modulus and scratch resistance of the diffuser is improved over prior art cast coated polymer diffusers rendering a more robust diffuser during the assembly operation of the liquid crystal device. The amorphous materials of the invention tend to be hard and scratch resistant therefore allowing these materials to be used as both a read diffuser and a front diffuser. These and other advantages will be apparent from the detailed description below.

The term "LCD" means any rear projection display device that utilizes liquid crystals to form the image. The term "diffuser" means any material that is able to diffuse specular light (light with a primary direction) to a diffuse light (light with random light direction). The term "light" means visible light. The term "diffuse light transmission" means the percent diffusely transmitted light at 500 nm as compared to the total amount of light at 500 nm of the light source. The term "total light transmission" means percentage light transmitted through the sample at 500 nm as compared to the total amount of light at 500 nm of the light source. This includes both spectral and diffuse transmission of light. The term "diffuse light transmission efficiency" means the ratio of % diffuse transmitted light at 500 nm to % total transmitted light at 500 nm multiplied by a factor of 100. The term "polymeric film" means a film comprising polymers. The term "polymer" means homo-and co-polymers. The term "average", with respect to lens size and frequency, means the arithmetic mean over the entire film surface area.

"Transparent" means a film with total light transmission of 50% or greater at 500 nm. "In any direction", with respect to lenslet arrangement on a film, means any direction in the x and y direction in the plane of the film. The term "pattern" means any predetermined arrangement of lenses whether regular or random.

An amorphous polymer is a polymer that does not exhibit melting transitions in a standard thermogram generated by the differential scanning calorimetry (DSC) method. According to this method (well known to those skilled in the art), a small sample of the polymer (5–20 mg) is sealed in a small aluminum pan. The pan is then placed in a DSC apparatus (e.g., Perkin Elmer 7 Series Thermal Analysis System) and its thermal response is recorded by scanning at a rate of 10–20° C./min from room temperature up to 300° C. Melting is manifested by a distinct endothermic peak. The absence of such peak indicates that the test polymer is functionally amorphous. A stepwise change in the thermogram represents the glass transition temperature of the polymer.

Better control and management of the back light are driving technological advances for liquid crystal displays (LCD). LCD screens and other electronic soft display media are back lit primarily with specular (highly directional) fluorescent tubes. Diffusion films are used to distribute the light evenly across the entire display area and change the light from specular to diffuse. Light exiting the liquid crystal section of the display stack leaves as a narrow column and must be redispersed. Diffusers are used in this section of the display to selectively spread the light out horizontally for an enhanced viewing angle.

Diffusion is achieved by light scattering as it passes though materials with varying indexes of refraction. This scattering produces a diffusing medium for light energy. There is an inverse relationship between transmittance of light and diffusion and the optimum combination of these two parameters must be found for each application.

The back diffuser is placed directly in front of the light source and is used to even out the light throughout the display by changing specular light into diffuse light. The diffusion film is made up of a plurality of lenslets on a web material to broaden and diffuse the incoming light. Prior art methods for diffusing LCD back light include layering polymer films with different indexes of refraction, micro-voided polymer film, or coating the film with matte resins or beads. The role of the front diffuser is to broaden the light coming out of the liquid crystal (LC) with directional selectivity. The light is compressed into a tight beam to enter the LC for highest efficient and when it exits it comes out as a narrow column of light. The diffuser uses optical structures to spread the light selectively. Most companies form elliptical micro-lens to selectively stretch the light along one axis. Elliptically shaped polymers in a polymer matrix and surface micro-lenses formed by chemical or physical means also achieve this directionality. The diffusion film of the present invention can be produced by using a conventional film-manufacturing facility in high productivity.

The polymeric diffusion film has a textured surface on at least one side, in the form of a plurality of random microlenses, or lenslets. The term "lenslet" means a small lens, but for the purposes of the present discussion, the terms lens and lenslet may be taken to be the same. The lenslets overlap to form complex lenses. "Complex lenses" means a major lens having on the surface thereof multiple minor lenses. "Major lenses" mean larger lenslets in which the minor lenses are formed randomly on top of. "Minor lenses" mean lenses smaller than the major lenses that are formed on the major lens. The plurality of lenses of all different sizes and shapes are formed on top of one another to create a complex lens feature resembling a cauliflower. The lenslets and complex lenses formed by the lenslets can be concave into the transparent polymeric film or convex out of the transparent polymeric film. The term "concave" means curved like the surface of a sphere with the exterior surface of the sphere closest to the surface of the film. The term "convex" means curved like the surface of a sphere with the interior surface of the sphere closest to the surface of the film. The term "top surface" means the surface of the film farther from the light source. The term "bottom surface" means the surface of the film closer to the light source.

One embodiment of the present invention could be likened to the moon's cratered surface. Asteroids that hit the moon form craters apart from other craters, that overlap a piece of another crater, that form within another crater, or that engulf another crater. As more craters are carved, the surface of the moon becomes a complexity of depressions like the complexity of lenses formed in the transparent polymeric film.

The surface of each lenslet is a locally spherical segment, which acts as a miniature lens to alter the ray path of energy passing through the lens. The shape of each lenslet is "semi-spherical" meaning that the surface of each lenslet is a sector of a sphere, but not necessarily a hemisphere. Its curved surface has a radius of curvature as measured relative to a first axis (x) parallel to the transparent polymeric film and a radius of curvature relative to second axis (y) parallel to the transparent polymeric film and orthogonal to the first axis (x). The lenses in an array film need not have equal dimensions in the x and y directions. The dimensions of the lenses, for example length in the x or y direction, are generally significantly smaller than a length or width of the film. "Height/Diameter ratio" means the ratio of the height of the complex lens to the diameter of the complex lens. "Diameter" means the largest dimension of the complex lenses in the x and y plane. The value of the height/diameter ratio is one of the main causes of the amount of light spreading, or diffusion that each complex lens creates. A small height/diameter ratio indicates that the diameter is much greater than the height of the lens creating a flatter, wider complex lens. A larger height/diameter value indicates a taller, skinner complex lens. The complex lenses may differ in size, shape, off-set from optical axis, and focal length.

The curvature, depth, size, spacing, materials of construction (which determines the basic refractive indices of the polymer film and the substrate), and positioning of the lenslets determine the degree of diffusion, and these parameters are established during manufacture according to the invention.

The divergence of light through the lens may be termed "asymmetric", which means that the divergence in the horizontal direction is different from the divergence in the vertical direction. The divergence curve is asymmetric, or that the direction of the peak light transmission is not along the direction θ=0°, but is in a direction non-normal to the surface. There are least three approaches available for making the light disperse asymmetrically from a lenslet diffusion film, namely, changing the dimension of the lenses in one direction relative to an orthogonal direction, off-setting the optical axis of the lens from the center of the lens, and using an astigmatic lens.

The result of using a diffusion film having lenses whose optical axes are off-set from the center of the respective lenses results in dispersing light from the film in an asymmetric manner. It will be appreciated, however, that the lens surface may be formed so that the optical axis is off-set from the center of the lens in both the x and y directions.

The lenslet structure can be manufactured on the opposite sides of the substrate. The lenslet structures on either side of the support can vary in curvature, depth, size, spacing, and positioning of the lenslets.

A transparent polymeric film having a top and bottom surface comprising a plurality of complex lenses on at least one surface thereof and containing as its primary ingredient a polymer sufficient to impart to the film a light transmission of at least 92% based on a film thickness of 125 micrometers is preferred. Complex lenses have been shown to provide very efficient diffusion of light. Further, the polymer lenses of the invention are transparent, allowing a high transmission of light through the polymeric film and complex lenses allowing the brightness of LC displays to emit more light. The light transmission of the transparent polymeric film of the invention requires, for measurement purposes, transmission scaling to 125 micrometers to account for the loss or gain of transmission as a function of material thickness. For example, a 125 micrometer polymer sheet with a light transmission of 95% would have a light transmission of 90% at 250 micrometers thickness. By scaling light transmission to 125 micrometers, the loss or gain in light transmission as a function of thickness is reduced.

In another preferred embodiment, a light transmission of at least 94% based on a film thickness of 125 micrometers is preferred. By increasing the brightness of the transparent polymeric film beyond 94%, the brightness of the LC devices is further enhanced. Also, by allowing at least 94% light transmission, this invention materials can be utilized for greenhouse diffusion screens to protect young cellulose plant during the sprouting process.

In another preferred embodiment of the invention, a light transmission of at least 96% based on a film thickness of 125 micrometers is preferred. By increasing the brightness of the transparent polymeric film beyond 96%, the brightness of the LC devices is further enhanced. Prior art light diffusion materials comprising polymer beads in a matrix typically have a light transmission of 85%. By increasing the light transmission to greater than 96%, by utilizing transparent polymers for the complex lenses, a significant improvement in device brightness will result allowing device manufactures to provide LC devices that function well in direct exposure to the sun or reduce the power consumption of the LC devices thereby extending battery life in portable devices such as digital cameras.

The preferred light transmission of the complex lenses of the invention is at least 94% based on a film thickness of 125 micrometers. Complex lenses with a light transmission of at least 94% have been shown to be excellent diffusers of visible light and pass light energy to better illuminate the subject matter. The light transmission of the complex element of the invention can be accomplished by forming the complex lenses on a smooth surface such as PTFE film and removing the lenses and measuring the transmission of the lenses separate from the transparent polymer. The light transmission of the lenses then need transmission scaling to 125 micrometers to account for the loss of transmission as a function of material thickness. In another embodiment of the invention, the preferred light transmission of the complex lenses of the invention is at least 96% based on a film thickness of 125 micrometers. By providing complex lenses with a light transmission greater that 96%, the utility of the light diffuser sheet is greatly enhanced compared to prior art materials that typically consist of polymer beads coated in a matrix.

The concave or complex lenses on the surface of the polymer film are preferably randomly placed. Random placement of lenses increases the diffusion efficiency of the invention materials. Further, by avoiding a concave or convex placement of lenses that ordered, undesirable optical interference patterns are avoided.

In an embodiment of the invention, the concave or convex lenses are located on both sides of the transparent polymer sheet. By placing the lenses on both sides of the transparent sheet, more efficient light diffusion is observed compared to the lenses of the invention on one side. Further, the placement of the lenses on both sides of the transparent sheet increases the focal length of the lenses furthest from the brightness enhancement film in a LC display device.

Preferably, the concave or convex lenses have an average frequency in any direction of between 4 and 250 complex lenses/mm. When a film has an average of 285 complex lenses/mm creates the width of the lenses approach the wavelength of light. The lenses will impart a color to the light passing through the lenses and change the color temperature of the display. Less than 4 lenses/mm Creates lenses that are too large and therefore diffuse the light less efficiently. Concave or convex lenses with an average frequency in any direction of between 22 and 66 complex lenses/mm are most preferred. It has been shown that an average frequency of between 22 and 6 complex lenses provide efficient light diffusion and can be efficiently manufactured utilizing cast coated polymer against a randomly patterned roll.

The preferred transparent polymeric film has concave or convex lenses at an average width between 3 and 60 microns in the x and y direction. When lenses have sizes below 1 micron the lenses impart a color shift in the light passing through because the lenses dimensions are on the order of the wavelength of light. When the lenses have an average width in the x or y direction of more than 68 microns, the lenses is too large to diffuse the light efficiently. More preferred, the concave or convex lenses at an average width between 15 and 40 microns in the x and y direction. This size lenses has been shown to create the most efficient diffusion.

The concave or convex complex lenses comprising minor lenses wherein the diameter of the smaller lenses is preferably less than 80%, on average, the diameter of the major lens. When the diameter of the minor lens exceeds 80% of the major lens, the diffusion efficiency is decreased because the complexity of the lenses is reduced.

The concave or convex complex lenses comprising minor lenses wherein the width in the x and y direction of the smaller lenses is preferably between 2 and 20 microns. When minor lenses have sizes below 1 micron the lenses impart a color shift in the light passing through because the lenses dimensions are on the order of the wavelength of light. When the minor lenses have sizes above 25 microns, the diffusion efficiency is decreased because the complexity of the lenses is reduced. Most preferred are the minor lenses having a width in the x and y direction between 3 and 8 microns. This range has been shown to create the most efficient diffusion.

Preferably, the concave or convex complex lenses comprise an olefin repeating unit. Polyolefins are low in cost and high in light transmission. Further, polyolefin polymers are efficiently melt extrudable and therefore can be used to create light diffusers in roll form.

In another embodiment of the invention, the concave or convex complex lenses comprise a carbonate repeating unit. Polycarbonates have high optical transmission values that allows for high light transmission and diffusion. High light transmission provides for a brighter LC device than diffusion materials that have low light transmission values.

In another embodiment of the invention, the concave or convex complex lenses comprise an ester repeating unit. Polyesters are low in cost and have good strength and surface properties. Further, polyester polymer is dimensionally stable at temperatures between 80 and 200 degrees C. and therefore can withstand the heat generated by display light sources.

Preferably, the transparent polymeric film wherein the polymeric film comprises an ester repeating unit. Polyesters are low in cost and have good strength and surface properties. Further, polyester polymer film is dimensionally stable over the current range of temperatures encountered in enclosed display devices. Polyester polymer easily fractures allowing for die cutting of diffuser sheets for insertion into display devices.

In another embodiment of the invention, the transparent polymeric film wherein the polymeric film comprises a carbonate repeating unit. Polycarbonates have high optical transmission values compared to polyolefin polymers and therefore can improve the brightness of display devices.

In another embodiment of the invention, the transparent polymeric film wherein the polymeric film comprises an olefin repeating unit. Polyolefins are low in cost and have good strength and surface properties.

In another embodiment of the invention, the transparent polymeric film wherein the polymeric film comprises a tri acetyl cellulose. Tri acetyl cellulose has both high optical transmission and low optical birefringence allowing the diffuser of the invention to both diffuse light and reduce unwanted optical patterns.

Preferably, the concave or convex lenses are semispherical meaning that the surface of each lenslet is a sector of a sphere, but not necessarily a hemisphere. This provides excellent even diffusion over the x y plane. The semispherical shaped lenses scatter the incident light uniformly, ideal for a backlit display application where the display area need to be lit uniformly.

In another embodiment of the invention, the concave or convex lenses are aspherical meaning that width of the lenses differ in the x and y direction. This scatters light selectively over the x y plane. For example, a particular x y aspect ratio might produce an elliptical scattering pattern. This would be useful in the front of a LC display, spreading the light more in the horizontal direction than the vertical direction for increased viewing angle.

The convex or concave lenses preferably have a height/diameter ratio of between 0.03 to 1.0. A height/diameter ratio of less than 0.01 (very wide and shallow lenses) limits diffusivity because the lenses do not have enough curvature to efficiently spread the light. A height/diameter ratio of greater than 2.5 creates lenses where the angle between the side of the lenses and the substrate is large. This causes internal reflection limiting the diffusion capability of the lenses. Most preferred is a height/diameter of the convex or concave lenses of between 0.25 to 0.48. It has been proven that the most efficient diffusion occurs in this range.

The number of minor lenses per major lens is preferably between 2 and 60. When a major lens has one or no minor lenses, its complexity is reduced and therefore it does not diffuse as efficiently. When a major lens has more than 70 minor lens contained on it, the width of some of the minor lens approaches the wavelength of light and imparts a color to the light transmitted. Most preferred is 5 to 18 minor lenses per major lens. This range has been shown to produce the most efficient diffusion.

The thickness of the transparent polymeric film preferably is less than 250 micrometers or more preferably between 12.5 and 50 micrometers. Current design trends for LC devices are toward lighter and thinner devices. By reducing the thickness of the light diffuser to less than 250 micrometers, the LC devices can be made lighter and thinner. Further, by reducing the thickness of the light diffuser, brightness of the LC device can be improved by reducing light transmission. The more preferred thickness of the light diffuser is between 12.5 and 50 micrometers which further allows the light diffuser to be convienently combined with a other optical materials in an LC device such as brightness enhancement films. Further, by reducing the thickness of the light diffuser, the materials content of the diffuser is reduced.

Since the thermoplastic light diffuser of the invention typically is used in combination with other optical web materials, a light diffuser with an elastic modulus greater than 500 MPa is preferred. An elastic modulus greater than 500 MPa allows for the light diffuser to be laminated with a pressure sensitive adhesive for combination with other optical webs materials. Further, because the light diffuser is mechanically tough, the light diffuser is better able to with stand the rigors of the assembly process compared to prior art cast diffusion films which are delicate and difficult to assemble.

FIG. 1 illustrates a cross section of an amorphous complex lens formed on a transparent base material suitable for use in a liquid crystal display device. The amorphous polymer complex lenses have been shown to provide light transmission greater than 94%. Light diffusion film 12 comprises transparent polymer base 20, onto which convex amorphous polymer major lens 22 is present on the of transparent polymer base surface 26. Amorphous polymer minor lenses 24 are present on the surface of the amorphous polymer major lens 22. The invention comprises a plurality of amorphous polymer minor lenses 24 on the surface of the amorphous polymer major lens 22 thus forming a complex lens. The light diffusion film of the invention contains many diffusion surfaces from both the amorphous polymer major lens 22 and the amorphous polymer minor lenses 24.

Figure 2:
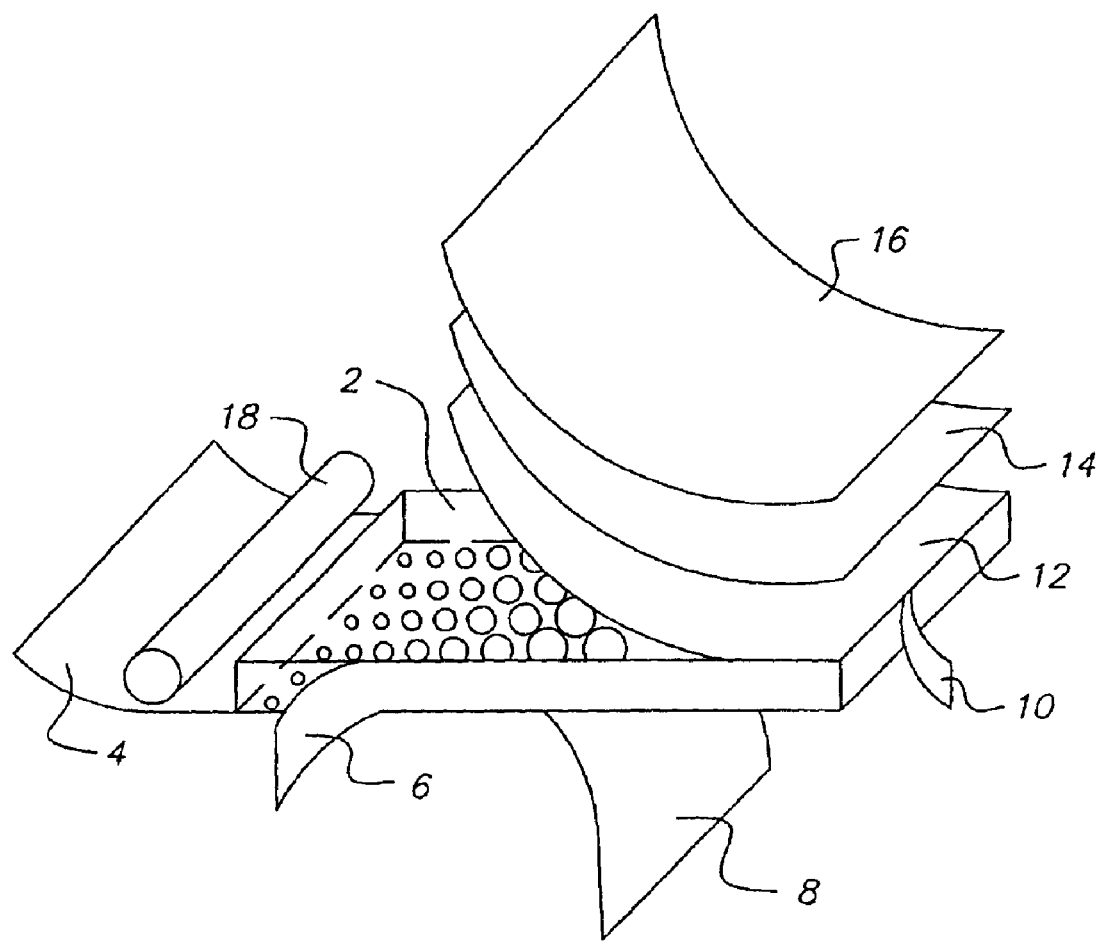
FIG. 2 illustrates a liquid crystal display device with an amorphous polymer light diffuser.

FIG. 2 illustrates a liquid crystal display device with a light diffuser. Visible light source 18 is illuminated and light is guided into light guide 2. Lamp reflector 4 is used to direct light energy into the light guide 2, represented by an acrylic box. Reflection tape 6, reflection tape 10 and reflection film 8 are utilized to keep light energy from exiting the light guide 2 in an unwanted direction. Light diffusion film 12 in the form of a transparent polymeric film is utilized to diffuse light energy exiting the light guide in a direction perpendicular to the light diffuser. Brightness enhancement film 14 is utilized to focus the light energy into polarization film 16. The light diffusion film 12 is in contact with brightness enhancement film 14.

Polymer sheet for the transparent polymeric film comprising a plurality of convex and/or concave complex lenses on a surface thereof are generally dimensionally stable, optically clear and contain a smooth surface. Biaxially oriented polymer sheets are preferred as they are thin and are higher in elastic modulus compared to cast coated polymer sheets. Biaxially oriented sheets are conveniently manufactured by co-extrusion of the sheet, which may contain several layers, followed by biaxial orientation. Such biaxially oriented sheets are disclosed in, for example, U.S. Pat. No. 4,764,425. A preferred transparent polymeric film composition comprises amorphous polymers having glass transition temperature greater than 60° C. Amorphous polymers, that is polymers that have a crystallinity less than 10% have been shown to provide excellent light transmission compared to polymers that have a high degree of crystallization such as LDPE, HDPE and more crystalline forms of polyester.

The complex lenses of the invention preferably comprise polymers that provide a high degree of light transmission. Polymers are preferred as they are generally lower in cost compared to prior art glass lenses, have excellent optical properties and can be efficiently formed into lenses utilizing known processes such as melt extrusion, vacuum forming and injection molding. A preferred complex lenses composition comprises amorphous polymers having glass transition temperature greater than 60° C. Amorphous polymers, that is polymers that have a crystallinity less than 10% have been shown to provide excellent light transmission compared to polymers that have a high degree of crystallization such as LDPE and HDPE.

In a preferred embodiment, the complex lenses materials selected from the following, poly(methyl methacrylate), polystyrene, poly(phenylene oxide), styrene acrylonitrile copolymer (SAN), cyclo-olefin polymer, poly(methyl pentene) and polycarbonates and mixtures thereof. The above polymers exhibit excellent light transmission compared to more crystalline polymers and can be formed into the complex lens geometry of the invention.

In another preferred embodiment, the complex lenses comprise amorphous polyesters (e.g., poly(ethylene terephthalate) modified by 1,4-cyclohexane dimethanol). Amorphous polyester provides excellent light transmission, can be easily process and extruded from a slit die and forms complex lenses that can withstand handling and abrasions typically encountered on light diffusers on the outside of portable devices such as PDAs.

In another preferred embodiment of the invention, the complex lenses of the invention comprise glass. Because glass is a solid substance in which there is a non-regular arrangement of atoms, glasses are not crystalline and therefore transmit a large percentage of light incident on the surface. Glass complex lenses would have a higher % light transmission that polymer complex lenses. Although the glass lenses would be more expensive to form compared to polymer lenses, high transmission light diffusion applications such as medical imaging and camera lenses are cost justified for the improvement in light transmission.

Addenda is preferably added to a polyester skin layer to change the color of the imaging element. An addenda of this invention that could be added is an optical brightener. An optical brightener is substantially colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis(O-Cyanostyryl) Benzol and 2-Amino-4-Methyl Phenol. An unexpected desirable feature of this efficient use of optical brightener. Because the ultraviolet source for a transmission display material is on the opposite side of the image, the ultraviolet light intensity is not reduced by ultraviolet filters common to imaging layers. The result is less optical brightener is required to achieve the desired background color.

The diffuser sheets may be coated or treated before or after thermoplastic lenslet casting with any number of coatings which may be used to improve the properties of the sheets including printability, to provide a vapor barrier, to make them heat sealable, or to improve adhesion. Examples of this would be acrylic coatings for printability, coating polyvinylidene chloride for heat seal properties. Further examples include flame, plasma or corona discharge treatment to improve printability or adhesion.

The diffuser sheets of the present invention may be used in combination with one or more layers selected from an optical compensation film, a polarizing film and a substrate constitution a liquid crystal layer. The diffusion film of the present invention is preferably used by a combination of diffusion film/polarizing film/optical compensation film in that order. In the case of using the above films in combination in a liquid crystal display device, the films could be bonded with each other e.g. through a tacky adhesive for minimizing the reflection loss, etc. The tacky adhesive is preferably those having a refractive index close to that of the oriented film to suppress the interfacial reflection loss of light.

The lenslet diffuser film may also be used in conjunction with another light diffuser, for example a bulk diffuser, a lenticular layer, a beaded layer, a surface diffuser, a holographic diffuser, a micro-structured diffuser, another lens array, or various combinations thereof. The lenslet diffuser film disperses, or diffuses, the light, thus destroying any diffraction pattern that may arise from the addition of an ordered periodic lens array. The lenslet diffuser film may be positioned before or after any diffuser or lens array.

The diffusion sheet of the present invention may be used in combination with a film or sheet made of a transparent polymer. Examples of such polymer are polyesters such as polycarbonate, polyethylene terephthalate, polybutylene terephthalate and polyethylene naphthalate, acrylic polymers such as polymethyl methacrylate, and polyethylene, polypropylene, polystyrene, polyvinyl chloride, polyether sulfone, polysulfone, polyacrylate and triacetyl cellulose. The bulk diffuser layer may be mounted to a glass sheet for support.

The transparent polymeric film of the invention can also include, in another aspect, one or more optical coatings to improve optical transmission through one or more lenslet channels. It is often desirable to coat a diffuser with a layer of an anti-reflective (AR) coating in order to raise the efficiency of the diffuser.

The diffuser sheet of the present invention may be incorporated with e.g. an additive or a lubricant such as silica for improving the surface-slipperiness of the film within a range not to deteriorate the optical characteristics to vary the light-scattering property with an incident angle. Examples of such additive are organic solvents such as xylene, alcohols or ketones, fine particles of an acrylic resin, silicone resin or Δ metal oxide or a filler.

The lenslet diffuser film of the present invention usually has optical anisotropy. The web material and the casted thermoplastic resin are generally optically anisotropic materials exhibiting optical anisotropy having an optic axis in the drawing direction. The optical anisotropy is expressed by the product of the film thickness d and the birefringence $\Delta n$ which is a difference between the refractive index in the slow optic axis direction and the refractive index in the fast optic axis direction in the plane of the film, i.e. $\Delta n*d$ (retardation). The orientation direction coincides with the drawing axis in the film of the present invention. The drawing axis is the direction of the slow optic axis in the case of a thermoplastic polymer having a positive intrinsic birefringence and is the direction of the fast optic axis for a thermoplastic polymer having a negative intrinsic birefringence. There is no definite requirement for the necessary level of the value of $\Delta n*d$ since the level depends upon the application of the film.

In the manufacturing process for this invention, preferred lens polymers are melt extruded from a slit die. In general, a T die or a coat hanger die are preferably used. The process involves extruding the polymer or polymer blend through a slit die and rapidly quenching the extruded web upon a chilled casting drum with the preferred lens geometry so that the lens polymer component of the transparent sheet are quenched below their glass solidification temperature and retain the shape of the diffusion lens.

A method of fabricating a diffusion film assembly was developed. The preferred approach comprises the steps of providing a positive master chill roll having a plurality of complex lenses. The diffusion film is replicated from the master chill roller by casting a molten polymeric material to the face of the chill roll and transferring the polymeric material with lenslet structures onto a transparent polymeric film.

A chill roller is manufactured by a process including the steps of electroplating a layer of cooper onto the surface of a roller, and then abrasively blasting the surface of the copper layer with beads, such as glass or silicon dioxide, to create a surface texture with hemispherical features. The resulting blasted surface is bright nickel electroplated or chromed to a depth that results in a surface texture with the features either concave into the roll or convex out of the roll. Because of the release characteristics of the chill roll surface, the resin will not adhere to the surface of the roller.

The bead blasting operation is carried out using an automated direct pressure system in which the nozzle feed rate, nozzle distance from the roller surface, the roller rotation rate during the blasting operation and the velocity of the particles are accurately controlled to create the desired lenslet structure.

The number of features in the chill roll per area is determined by the bead size and the pattern depth. Larger bead diameters and deeper patterns result in fewer numbers of features in a given area. Therefore the number of features is inherently determined by the bead size and the pattern depth.

The complex lenses of the invention may also be manufactured by vacuum forming around a pattern, injection molding the lenses and embossing lenses in a polymer web. While these manufacturing techniques do yield acceptable lenses capable of efficiently diffusing light, melt cast coating polymer onto a patterned roll and subsequent transfer onto a transparent polymer web allows for the lenses of the invention to be formed into rolls thereby lowering the manufacturing cost for the diffusion lenses. Further, cast coating polymer has been shown to more efficiently replicate the desired complex lens geometry compared to embossing and vacuum forming.

The invention may be used in conjunction with any liquid crystal display devices, typical arrangements of which are described in the following. Liquid crystals (LC) are widely used for electronic displays. In these display systems, an LC layer is situated between a polarizer layer and an analyzer layer and has a director exhibiting an azimuthal twist through the layer with respect to the normal axis. The analyzer is oriented such that its absorbing axis is perpendicular to that of the polarizer. Incident light polarized by the polarizer passes through a liquid crystal cell is affected by the molecular orientation in the liquid crystal, which can be altered by the application of a voltage across the cell. By employing this principle, the transmission of light from an external source, including ambient light, can be controlled The energy required to achieve this control is generally much less than that required for the luminescent materials used in other display types such as cathode ray tubes. Accordingly, LC technology is used for a number of applications, including but not limited to digital watches, calculators, portable computers, electronic games for which light weight, low power consumption and long operating life are important features.

Active-matrix liquid crystal displays (LCDs) use thin film transistors (TFTs) as a switching device for driving each liquid crystal pixel. These LCDs can display higher-definition images without cross talk because the individual liquid crystal pixels can be selectively driven. Optical mode interference (OMI) displays are liquid crystal displays, which are "normally white," that is, light is transmitted through the display layers in the off state. Operational mode of LCD using the twisted nematic liquid crystal is roughly divided into a birefringence mode and an optical rotatory mode. "Film-compensated super-twisted nematic" (FSTN) LCDs are normally black, that is, light transmission is inhibited in the off state when no voltage is applied. OMI displays reportedly have faster response times and a broader operational temperature range.

Ordinary light from an incandescent bulb or from the sun is randomly polarized, that is, it includes waves that are oriented in all possible directions. A polarizer is a dichroic material that functions to convert a randomly polarized ("unpolarized") beam of light into a polarized one by selective removal of one of the two perpendicular plane-polarized components from the incident light beam. Linear polarizers are a key component of liquid-crystal display (LCD) devices.

There are several types of high dichroic ratio polarizers possessing sufficient optical performance for use in LCD devices. These polarizers are made of thin sheets of materials which transmit one polarization component and absorb the other mutually orthogonal component (this effect is known as dichroism). The most commonly used plastic sheet polarizers are composed of a thin, uniaxially-stretched polyvinyl alcohol (PVA) film which aligns the PVA polymer chains in a more-or-less parallel fashion. The aligned PVA is then doped with iodine molecules or a combination of colored dichroic dyes (see, for example, EP 0 182 632 A2, Sumitomo Chemical Company, Limited) which adsorb to and become uniaxially oriented by the PVA to produce a highly anisotropic matrix with a neutral gray coloration. To mechanically support the fragile PVA film it is then laminated on both sides with stiff layers of triacetyl cellulose (TAC), or similar support.

Contrast, color reproduction, and stable gray scale intensities are important quality attributes for electronic displays, which employ liquid crystal technology. The primary factor limiting the contrast of a liquid crystal display is the propensity for light to "leak" through liquid crystal elements or cell, which are in the dark or "black" pixel state. Furthermore, the leakage and hence contrast of a liquid crystal display are also dependent on the angle from which the display screen is viewed. Typically the optimum contrast is observed only within a narrow viewing angle centered about the normal incidence to the display and falls off rapidly as the viewing angle is increased. In color displays, the leakage problem not only degrades the contrast but also causes color or hue shifts with an associated degradation of color reproduction. In addition to black-state light leakage, the narrow viewing angle problem in typical twisted nematic liquid crystal displays is exacerbated by a shift in the brightness-voltage curve as a function of viewing angle because of the optical anisotropy of the liquid crystal material.

The transparent polymeric film of the present invention can even out the luminance when the film is used as a light-scattering film in a backlight system. Back-lit LCD display screens, such as are utilized in portable computers, may have a relatively localized light source (ex. fluorescent light) or an array of relatively localized light sources disposed relatively close to the LCD screen, so that individual "hot spots" corresponding to the light sources may be detectable. The diffuser film serves to even out the illumination across the display. The liquid crystal display device includes display devices having a combination of a driving method selected from e.g. active matrix driving and simple matrix drive and a liquid crystal mode selected from e.g. twist nematic, supertwist nematic, ferroelectric liquid crystal and intiferroelectric liquid crystal mode, however, the invention is not restricted by the above combinations. In a liquid crystal display device, the oriented film of the present invention is necessary to be positioned in front of the backlight. The lenslet diffuser film of the present invention can even the lightness of a liquid crystal display device across the display because the film has excellent light-scattering properties to expand the light to give excellent visibility in all directions. Although the above effect can be achieved even by the single use of such lenslet diffuser film, plural number of films may be used in combination. The-homogenizing lenslet diffuser film may be placed in front of the LCD material in a transmission mode to disburse the light and make it much more homogenous. The present invention has a significant use as a light source destructuring device. In many applications, it is desirable to eliminate from the output of the light source itself the structure of the filament which can be problematic in certain applications because light distributed across the sample will vary and this is undesirable. Also, variances in the orientation of a light source filament or arc after a light source is replaced can generate erroneous and misleading readings. A homogenizing lenslet diffuser film of the present invention placed between the light source and the detector can eliminate from the output of the light source any trace of the filament structure and therefore causes a homogenized output which is identical from light source to light source.

The lenslet diffuser films may be used to control lighting for stages by providing pleasing homogenized light that is directed where desired. In stage and television productions, awide variety of stage lights must be used to achieve all the different effects necessary for proper lighting. This requires that many different lamps be used which is inconvenient and expensive. The films of the present invention placed over a lamp can give almost unlimited flexibility dispersing light where it is needed. As a consequence, almost any object, moving or not, and of any shape, can be correctly illuminated.

The reflection film formed by applying a reflection layer composed of a metallic film, etc., to the lenslet diffuser film of the present invention can be used e.g. as a retroreflective member for a traffic sign. It can be used in a state applied to a car, a bicycle, person, etc.

The lenslet diffuser films of the present invention may also be used in the area of law enforcement and security systems to homogenize the output from laser diodes (LDs) or light emitting diodes (LEDs) over the entire secured area to provide higher contrasts to infrared (IR) detectors. The films of the present invention may also be used to remove structure from devices using LED or LD sources such as in bank note readers or skin treatment devices. This leads to greater accuracy.

Fiber-optic light assemblies mounted on a surgeon's headpiece can cast distracting intensity variations on the surgical field if one of the fiber-optic elements breaks during surgery. A lenslet diffuser film of the present invention placed at the ends of the fiber bundle homogenizes light coming from the remaining fibers and eliminates any trace of the broken fiber from the light cast on the patient. A standard ground glass diffuser would not be as effective in this use due to significant back-scatter causing loss of throughput.

The lenslet diffuser films of the present invention can also be used to homogeneously illuminate a sample under a microscope by destructuring the filament or arc of the source, yielding a homogeneously illuminated field of view. The films may also be used to homogenize the various modes that propagate through a fiber, for example, the light output from a helical-mode fiber.

The lenslet diffuser films of the present invention also have significant architectural uses such as providing appropriate light for work and living spaces. In typical commercial applications, inexpensive transparent polymeric diffuser films are used to help diffuse light over the room. A homogenizer of the present invention which replaces one of these conventional diffusers provides a more uniform light output so that light is diffused to all angles across the room evenly and with no hot spots.

The lenslet diffuser films of the present invention may also be used to diffuse light illuminating artwork. The transparent polymeric film diffuser provides a suitable appropriately sized and directed aperture for depicting the artwork in a most desirable fashion.

Further, the lenslet diffuser film of the present invention can be used widely as a part for an optical equipment such as a displaying device. For example, it can be used as a light-reflection plate laminated with a reflection film such as a metal film in a reflective liquid crystal display device or a front scattering film directing the film to the front-side (observer's side) in the case of placing the metallic film to the back side of the device (opposite to the observer), in addition to the aforementioned light-scattering plate of a backlight system of a liquid crystal display device. The lenslet diffuser film of the present invention can be used as an electrode by laminating a transparent conductive layer composed of indium oxide represented by ITO film. If the material is to be used to form a reflective screen, e.g. front projection screen, a light-reflective layer is applied to the transparent polymeric film diffuser.

Another application for the transparent polymeric diffuser film is a rear projection screen, where it is generally desired to project the image from a light source onto a screen over a large area. The viewing angle for a television is typically smaller in the vertical direction than in the horizontal direction. The diffuser acts to spread the light to increase viewing angle.

Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2.5 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

Embodiments of the invention may provide not only improved light diffusion and transmission but also a diffusion film of reduced thickness, and that has reduced light scattering tendencies.

The entire contents of the patents and other publications referred to in this specification are incorporated herein by reference.

EXAMPLES

In this example, complex light diffusion lenses of the invention were created by extrusion casting both an extrusion grade amorphous polyester polymer (invention) and a crystalline extrusion grade polyolefin polymer against a pattered chill roll containing the complex lens geometry. The patterned invention and control, in the form the complex lens was then transferred to a polyester web material thereby forming a light diffuser with complex surface lenses. This example will show that amorphous polymer complex lenses are superior to both crystalline complex lenses and a prior art light diffuser utilizing a dispersion of spherical beads in an acrylic matrix. Further, it will be obvious that the light diffuser will be low in cost and have mechanical properties that allows for insertion into LC devices.

The complex lens patterned chill roll was manufactured by a process including the steps of electroplating a layer of cooper onto the surface of a roller, and then abrasively blasting the surface of the copper layer with glass beads to create a surface texture with hemispherical features. The resulting blasted surface was bright nickel electroplated to a depth that results in a surface texture with the features either concave into the roll or convex out of the roll. The bead blasting operation was carried out using an automated direct pressure system in which the nozzle feed rate, nozzle distance from the roller surface, the roller rotation rate during the blasting operation and the velocity of the particles are accurately controlled to create the desired complex lens structure. The number of features in the chill roll per area is determined by the bead size and the pattern depth. Larger bead diameters and deeper patterns result in fewer numbers of features in a given area. The complex lens patterned roll was manufactured by starting with a steel roll blank and grit blasted with size 14 grit at a pressure of 447 MPa. The roll was then chrome platted. The resulting complex lenses on the surface of the roll were convex.

The patterned chill roll was utilized to create light diffusion sheets by extrusion coating the following polymers from a coat hanger slot die,
Invention polymer: PETG 6763 (Trademark of Eastman Chemical Co., US) is a poly(ethylene terephthalate) modified at a level of approx. 31 mol % of 1,4-cyclohexane dimethanol of total glycol moieties. The PETG 6763 cast coating coverage was 21.46 g/m$^2$.
Control polymer: comprising substantially 96.5% LDPE (Eastman Chemical grade D4002P), 3% Zinc Oxide and 0.5% of calcium stearate.

The formed invention and control complex lenses were applied to a 100 micrometer transparent oriented amorphous PETG 6763 polyester web with a % light transmission of 96.6%.

The invention and control materials containing complex lenses of the invention had randomly distributed lenses comprising a major lens with an average diameter of 27.1 micrometers and minor lenses on the surface of the major lenses with an average diameter of 6.7 micrometers. The average minor to major lens ratio was 17.2 to 1. The control diffusion sheet comprising randomly distributed single lenses with an average diameter of 25.4 micrometers. The structure of the cast coated diffusion sheet of the example was as follows, ---
Formed polyolefin complex lenses
Transparent polyester base
---

The two diffusion sheets containing formed polymer lenses from above (invention and control) and a prior polymer light diffuser containing 8 micrometers polymer beads in an acrylic binder layer coated on a polyester web material were measured for % light transmission, % diffuse light transmission, % specular light transmission and % diffuse reflectance.

Diffusion film samples were measured with the Hitachi U4001 UV/Vis/NIR spectrophotometer equipped with an integrating sphere. The total transmittance spectra were measured by placing the samples at the beam port with the front surface with complex lenses towards the integrating sphere. A calibrated 99% diffusely reflecting standard (NIST-traceable) was placed at the normal sample port. The diffuse transmittance spectra were measured in like manner, but with the 99% tile removed. The diffuse reflectance spectra were measured by placing the samples at the sample port with the coated side towards the integrating sphere. In order to exclude reflection from a sample backing, nothing was placed behind the sample. All spectra were acquired between 350 and 800 nm. As the diffuse reflectance results are quoted with respect to the 99% tile, the values are not absolute, but would need to be corrected by the calibration report of the 99% tile.

Percentage total transmitted light refers to percent of light that is transmitted though the sample at all angles. Diffuse transmittance is defined as the percent of light passing though the sample excluding a 2.5 degree angle from the incident light angle. The diffuse light transmission is the percent of light that is passed through the sample by diffuse transmittance. Diffuse reflectance is defined as the percent of light reflected by the sample. The percentages quoted in the examples were measured at 500 nm. These values may not add up to 100% due to absorbencies of the sample or slight variations in the sample measured.

The measured values for the invention, control and prior art materials are listed in Table 1 below.

TABLE 1

| Sample | 1<br>Invention<br>(PETG Lenses) | 2<br>Control<br>(LDPE Lenses) | 3<br>Control<br>(Prior Art) |
|---|---|---|---|
| Total transmission measured at 500 nm | 94.2 | 91.7 | 66.7 |
| Diffuse transmission measured at 500 nm | 87.4 | 85.2 | 65.7 |
| Spectral transmission measured at 500 nm | 6.8 | 6.5 | 1.0 |
| Diffuse reflectance measured at 500 nm | 5.2 | 7.6 | 33.3 |

As the data above clearly indicates, complex polymer lenses form from the amorphous PETG 6567 polymer (invention) provided superior light transmission to control polymer lenses consisting of LDPE. The additional crystallinity in the LDPE formed lenses reduced the light transmission of the complex lenses by 2.5%. A 2.5% improvement in light transmission (invention compared to the LDPE control) translates into a significant improvement in LC device brightness allowing LC images to be brighter and better able to compete with ambient light sources such as sunlight. Further, the improvement in light transmission (invention to control) also increased the amount of diffuse transmission and reduced unwanted diffuse reflectance. Compared to the prior art materials, the complex lenses of the invention provided superior total light transmission diffuse transmission and diffuse reflectance which is an indication of the diffusion efficiency of complex lenses compared to the simple lenses utilized in prior art bead coated diffusion sheets.

Further, because the invention materials were constructed on an oriented polyester base, the materials have a higher elastic modulus compared to cast diffuser sheets. The oriented polymer base of the example allows for the light diffuser to be thin and therefore cost efficient and light as the materials content of the example materials is reduced compared to prior art materials. Additionally, the PETG complex lenses are significantly harder (65%) compared to the LDPE control lenses allowing the light diffuser of the invention to be utilized as a front diffuser that can be subjected to handling damage and scratches. The LDPE complex lenses were soft and prone to handling damage and scratching making the LDPE lenses better suited as a rear diffuser sheet in an LC device for example.

While this example was primarily directed toward the use of thermoplastic light diffusion materials for LC devices, the materials of the invention have value in other diffusion applications such as back light display, imaging elements containing a diffusion layer, a diffuser for specular home lighting and privacy screens, wave guides, transflectors, image capture diffusion lenses and greenhouse light diffusion.

| Parts List | |
|---|---|
| 2. | Light guide |
| 4. | Lamp Reflector |
| 6. | Reflection tape |
| 8. | Reflection film |
| 10. | Reflection tape |
| 12. | Amorphous polymer light diffusion film |
| 14. | Brightness enhancement film |
| 16. | Polarization film |
| 18. | Visible light source |
| 20. | Transparent polymer base |
| 22. | Amorphous PET major lens |
| 24. | Amorphous PET minor lens |
| 26. | Surface of transparent polymer base |

What is claimed is:

1. A transparent polymeric film having a top and bottom surface comprising a plurality of complex lenses on at least one surface thereof and containing as its primary ingredient a polymer sufficient to impart to the film a light transmission of at least 94%, based on a film thickness of 125 micrometers.

2. The transparent polymeric film of claim 1 wherein said polymeric film has a light transmission of at least 96% based on a film thickness of 125 micrometers.

3. The transparent polymeric film of claim 1 wherein said complex lenses are contained in a layer coated on a transparent polymeric base the layer having a light transmission of at least 96% based on a film thickness of 125 micrometers.

4. The transparent polymeric film of claim 3 wherein said complex lens layer has a light transmission of at least 98 based on a film thickness of 125 micrometers.

5. The transparent polymeric film of claim 3 wherein the transparent polymeric base has a light transmission of at least 96% based on a film thickness of 125 micrometers.

6. The transparent polymeric film of claim 5 wherein said transparent polymeric base has a light transmission of at least 98% based on a film thickness of 125 micrometers.

7. The film of claim 1 wherein the complex lenses comprise amorphous polymers having glass transition temperature great than 60° C.

8. The film of claim 7 wherein the complex lenses comprise amorphous polyesters.

9. The film of claim 8 wherein the complex lenses comprise poly(ethylene terephthalate) modified by 1,4-cyclohexane dimethanol.

10. The film of claim 1 wherein the complex lenses comprise poly(methyl methacrylate), polystyrene, poly(phenylene oxide), styrene acrylonitrile copolymer, cyclo-olefin polymer, poly(methyl pentene), polycarbonate or copolymers of any of the foregoing.

11. The film of claim 1 wherein the complex lenses comprise glass.

12. The film of claim 1 wherein the complex lenses are randomly distributed on the surface.

13. The film of claim 1 wherein the complex lenses are present on both the top and bottom surfaces of the transparent polymeric film.

14. The film of claim 1 wherein the complex lenses have an average frequency in any direction of 5 to 250 complex lenses/mm.

15. The transparent polymeric film of claim 14 wherein the complex lenses have an average frequency in any direction of 22 to 66 complex lenses/mm.

16. The transparent polymeric film of claim 1 wherein the complex lenses have an average width in the x and y direction in the plane of the film of 3 to 60 microns.

17. The transparent polymeric film of claim 16 wherein the complex lenses have an average width in the x and y direction of 15 to 40 microns.

18. The transparent polymeric film of claim 1 wherein the complex lenses comprise major lenses and minor lenses wherein the diameter of the minor lenses is on average less than 80% of the diameter of the major lens they are associated with.

19. The transparent polymeric film of claim 1 wherein the complex lenses comprise a multiple of minor lenses where the minor lenses have, on average, a width in the x and y direction of 2 to 2 microns.

20. The transparent polymeric film of claim 19 wherein the complex lenses comprise a multiple of minor lenses wherein the minor lenses have, on average, a width in the x and y direction of 3 to 8 microns.

21. The transparent polymeric film of claim 1 wherein the transparent film is composed of a material that comprises ester repeating unit.

22. The transparent polymeric film of claim 1 wherein the transparent film is composed of a material that comprises carbonate repeating unit.

23. The transparent polymeric film of claim 1 wherein the transparent film is composed of a material that comprises an olefin repeating unit.

24. The transparent polymeric film of claim 1 wherein the transparent film is composed of a material that comprises tri acetyl cellulose.

25. The transparent polymeric film of claim 1 wherein the complex lenses are semi-spherical.

26. The transparent polymeric film of claim 1 wherein the complex lenses are aspherical.

27. The transparent polymeric film of claim 1 wherein the complex lenses have a height/diameter ratio of 0.03 to 1.0.

28. The transparent polymeric film of claim 27 wherein the complex lenses have a height/diameter ratio of 0.25 to 0.48.

29. The transparent polymeric film of claim 18 wherein the number of minor lenses per major lens is, on average, 2 to 60.

30. The transparent polymeric film of claim 29 wherein the number of minor lenses per major lens is, on average, 5 to 8.

31. The transparent polymeric film of claim 1 having a thickness of less than 250 micrometers.

32. The transparent polymeric film of claim 31, having a thickness of 12.5 to 50 micrometers.

33. The transparent polymeric film of claim 1 wherein the elastic modulus of the transparent polymeric film is great than 500 MPa.

34. A transparent polymeric film having a top and bottom surface comprising a plurality of complex lenses on at least one surface thereof and containing as its primary ingredient a polymer sufficient to impart to the film a light transmission of at least 92% based on a film thickness of 125 micrometers wherein said complex lenses are contained in a layer coated on a transparent polymeric base the layer having a light transmission of at least 96% based on a film thickness of 125 micrometers.

35. A transparent polymeric film having a top and bottom surface comprising a plurality of complex lenses on at least one surface thereof and containing as its primary ingredient a polymer sufficient to impart to the film a light transmission of at least 92% based on a film thickness of 25 micrometers wherein the complex lenses comprise poly(ethylene terephthalate) modified by 1,4-cyclohexane dimethanol.

36. A transparent polymeric film having a top and bottom surface comprising a plurality of complex lenses on at least one surface thereof and containing as its primary ingredient a polymer sufficient to impart to the film a light transmission of at least 92% based on a film thickness of 125 micrometers wherein the transparent polymeric film has a thickness of less than 250 micrometers.

37. The transparent polymeric film of claim 36 wherein the transparent polymeric film has a thickness of 12.5 to 50 micrometers.

* * * * *

UNITED STATES PATENT AND TRADEMARK OFFICE
CERTIFICATE OF CORRECTION

PATENT NO. : 6,867,927 B2
DATED : March 15, 2005
INVENTOR(S) : Robert P. Bourdelais et al.

It is certified that error appears in the above-identified patent and that said Letters Patent is hereby corrected as shown below:

Column 20,
Line 42, change "8" to -- 18 --.
Line 63, change "thickness of 25 micrometers" to -- thickness of 125 micrometers --.

Signed and Sealed this

Eighteenth Day of October, 2005

JON W. DUDAS
*Director of the United States Patent and Trademark Office*